July 27, 1943.    W. J. KIENE    2,325,326
DAMPENING AND MOTION TRANSMISSION MECHANISM FOR GAUGES
Filed Aug. 13, 1941
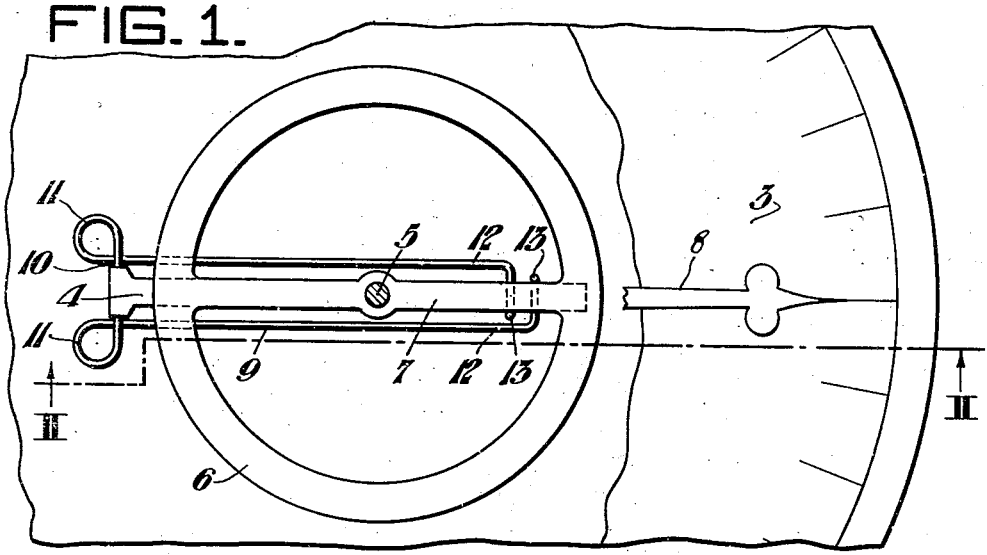
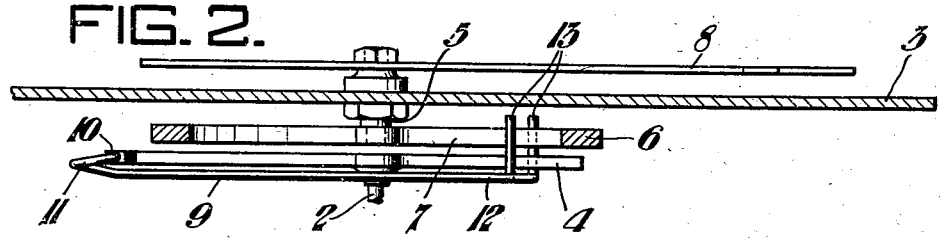
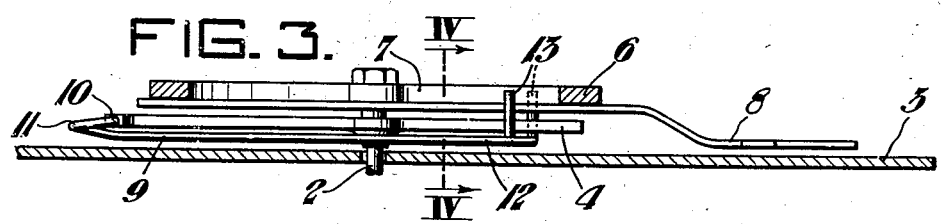
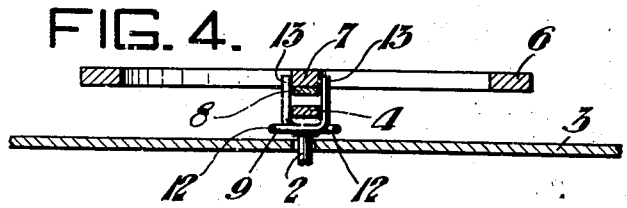
Inventor:
WILLIAM J. KIENE,
by: John E. Jackson
his Attorney.

Patented July 27, 1943

2,325,326

UNITED STATES PATENT OFFICE 2,325,326

DAMPENING AND MOTION TRANSMISSION MECHANISM FOR GAUGES

William J. Kiene, Chicago, Ill.

Application August 13, 1941, Serial No. 406,703

5 Claims. (Cl. 73—151)

This invention relates to gauges and the like and, particularly, to an improved dampening mechanism for the indicating means thereof.

In gauges, such as pressure gauges, and other similar instruments, the pointer or indicating means is usually carried by or connected directly to the rotatable driven member or spindle of the gauge or instrument. In some gauges, the pointer or indicating means will vibrate when the gauge is in use, thereby tending to vibrate the entire mechanism of the gauge or instrument. Such vibrations not only result at times in damaging the parts of the gauge, but it is also difficult to accurately read the gauge under such vibratory conditions.

In other types of gauges, the pressure is applied instantaneously or suddenly and oftentimes the pressure is relieved therefrom in a like manner, thereby subjecting the indicating means or pointer to such a sudden shock that it tends to loosen the pointer from its fixed position on the spindle and results in misplacing the pointer relative to the dial of the gauge. Consequently, the gauge thereafter will not register the correct reading and will be inaccurate. Furthermore, such sudden movement of the pointer, and resulting shock, not only tends to damage the pointer but oftentimes results in damage to other parts of the gauge, which is, of course, unsatisfactory in that it necessitates frequent replacement of the pointer and other parts of the gauge or instrument.

In the gauge of the present invention, the pointer or indicating means is not connected directly to the spindle or rotatable driven member but is independently mounted and there is provided a dampening means, in the form of a spring mechanism, which is arranged between the driven member and the pointer, or indicating means, of the gauge for reducing the vibration of the gauge to a minimum and for absorbing any shock to which the pointer, or indicating means, might be subjected thereby tending to eliminate the above named disadvantages.

Accordingly, it is one of the objects of this invention to provide an improved gauge wherein the pointer and other parts of the gauge are not subjected to any undue shock or vibratory movement during the operation thereof.

It is another object of the invention to provide an improved dampening means for gauges and the like which is simple and inexpensive in its construction and, at the same time, one which is efficient and effective in its use.

It is a further object of this invention to provide an improved dampening means for gauges and the like which eliminates any danger of the pointer or indicating means being misplaced or broken so that the gauge will at all times register accurately under any operating conditions.

Various other objects and advantages of this invention will become more apparent during the course of the following specification and will be particularly pointed out in the appended claims.

In the accompanying drawing, there is shown, for the purpose of illustration, one embodiment and modification thereof which my invention may assume in practice.

In the drawing:

Figure 1 is a plan view of part of a gauge showing one form of the improved dampening means of my invention incorporated therewith;

Figure 2 is a sectional view taken on line II—II of Figure 1;

Figure 3 is a cross-sectional view through a gauge similar to Figure 2, illustrating another arrangement of the improved dampening means of my invention; and Figure 4 is a sectional view taken on line IV—IV of Figure 3.

Referring more particularly to the drawing, the improved dampening means of my invention is shown incorporated with a conventional type gauge. There is shown for the purpose of illustration only the forward mechanism of the gauge, namely the spindle 2 and the dial 3.

The preferred form of dampening means of my invention as shown in Figures 1 and 2 of the drawing, comprises a bar-like member 4 which is securely arranged on the outer end of the spindle 2 on the inner side of the dial 3. There is suitably journaled on the dial 3 at a point directly opposite the end of the spindle 2, and preferably in axial alignment therewith, a stud shaft 5 on which there is securely mounted on the inner side of the dial 3, preferably an annular member 6 having a diametrically arranged bar-like portion 7 incorporated therewith. There is also mounted on the stud shaft 5 on the outer side of the dial 3 an indicating means such as the pointer or hand 8, which is adapted to cooperate with the dial 3 so as to indicate thereon the gauge reading. The diametrically arranged bar-like portion 7 of the annular member 6 is preferably substantially the same width as that of the pointer or hand 8.

There is carried by the bar-like member 4, which is arranged on the end of the spindle 2, a resilient means such as the spring 9. The spring 9 is securely attached, preferably intermediate the ends thereof, to one end of the bar-like member 4 as at 10. To either side of the point of attachment, namely, the point 10, there is arranged in the spring a looped or coiled portion 11. The end portions 12 of the spring 9 extend inwardly, preferably along the opposed sides of bar-like member 4, with the extreme free end portions 13 thereof bent and extending outwardly so that one end portion lies on one side of the bar-like member 4 and directly next thereto and to one side of the diametrically arranged portion 7 of the annular member 6. The other free end portion 13 likewise is bent and extends outwardly on the opposite side of the bar-like member 4 and the opposite side of the diametrically arranged portion 7 of the annular member 6.

In the modification shown in Figures 3 and 4 of the drawing, the entire dampening mechanism is positioned on the outer side of the dial of the gauge. In this construction, the spindle 2 extends through the dial 3 with the bar-like member 4 carried thereby adapted to be positioned directly next to the dial on the outer side thereof. In this construction, the pointer or hand 8, together with the annular member 6, is securely attached to the stud shaft 5, which, in turn, is journaled in the end of the spindle 2 so as to be freely rotatable relative thereto. The free ends 13 of the spring 9 extend outwardly as before and straddle both the pointer 8, together with the diametrically arranged portion 7 of the annular member 6. This latter construction has the advantage of being easily attached to any gauge now in use but the friction resulting from the stud shaft 5 being journaled in the end of the spindle 2 detracts from the dampening effect of the mechanism.

Thus, it will be understood that when the spindle 2 rotates, the spring 9 carried by the bar-like member 4 will yieldably rotate the annular member 6 together with the pointer 8 arranged therewith through the action of the outwardly extending portions 13 of the spring. It will be seen that the annular member 6 has considerable inertia and is adapted to rotate with the hand or pointer of the gauge to which it is securely attached.

As a result of my invention, it will be seen that the spring 9 yieldably rotates the pointer 8, thereby preventing the same, together with the other parts of the gauge, from vibrating in that the spring acts as a dampening means for preventing vibration.

While I have shown and described several embodiments of my invention, it will be understood that these embodiments are merely for the purpose of illustration and description and that various other forms may be devised within the scope of my invention, as defined in the appended claims.

I claim:

1. In a gauge or the like having a dial and a rotatable indicating means which is adapted to cooperate therewith, a rotatable driven member, a rotatable stud shaft upon which the indicating means is mounted with the axis of the said shaft arranged substantially in alignment with that of said rotatable driven member, a spring carried by said driven member adjacent said stud shaft, and means carried by said stud shaft with which said spring is adapted to cooperate, said spring attached to said rotatable member intermediate the length of the spring with the free ends of said spring extending outwardly into engagement with the said last-mentioned means whereby said spring is adapted to yieldably rotate said stud shaft together with the indicating means carried thereby upon rotation of said driven member.

2. In a gauge or the like having a dial and a rotatable indicating means which is adapted to cooperate therewith as defined in claim 1, wherein the means carried by said stud shaft with which the spring is adapted to cooperate consists of an annular member having a bar-like portion arranged diametrically thereof with one of the free ends of the spring disposed to each side of the bar-like portion and directly next thereto.

3. In a gauge or the like having a rotatable indicating means, a rotatable member upon which said indicating means is mounted, a rotatable driven member with the axis thereof arranged substantially in alignment with that of said rotatable member, and a spring mechanism arranged between said driven member and said rotatable indicating means consisting of a spring member which is securely attached to said rotatable driven member intermediate the ends thereof with the free ends of the spring extending outwardly into engagement with said rotatable indicating means, said spring member adapted to yieldably rotate said indicating means upon rotation of said driven member whereby a dampening effect is provided for said rotatable indicating means.

4. In a gauge or the like having an indicating means which is adapted to be rotated, a rotatable driven member, a rotatable member upon which the indicating means is securely arranged with the axis of said rotatable member arranged substantially in alignment with that of said driven member, a spring mechanism arranged between said driven member and said rotatable member whereby the driven member is adapted to rotate the rotatable member, said spring mechanism comprising a pair of elongated resilient members securely attached at one end thereof to said driven member with one arranged to either side of the axis of said driven and rotatable members whereby one of said resilient members is adapted to limit yieldably the rotative movement of the rotatable member together with the indicating means arranged therewith relative to said driven member when the same is rotated in one direction and the other of said resilient members is adapted to limit yieldably the rotative movement of the rotatable member together with the indicating means arranged therewith relative to the driven member when the same is rotated in the opposite direction whereby a dampening effect is provided for said indicating means, and means arranged with said rotatable member with which said resilient members of the spring mechanism cooperate to rotate the rotatable member.

5. In a gauge or the like having an indicating means which is adapted to be rotated, as defined in claim 4, wherein the pair of elongated resilient members of the spring mechanism consists of two substantially parallel leaf-like spring members with one arranged to either side of the center of the axis of rotation of the rotatable and driven members and extending substantially perpendicular to the axis of rotation thereof, each of said leaf-like spring members having one end thereof bent outwardly substantially perpendicular to the main body portion of the same, and means carried by said rotatable member with which the bent ends of said leaf-like spring portions cooperate to rotate the same together with the indicating means arranged therewith.

WILLIAM J. KIENE.